(12) United States Patent
Sugiyama

(10) Patent No.: US 6,965,449 B2
(45) Date of Patent: Nov. 15, 2005

(54) PRINTING SYSTEM, INFORMATION PROCESSOR, AND AUTHENTICATING METHOD

(75) Inventor: Kouichi Sugiyama, Tokyo (JP)

(73) Assignee: Canon Kabushiki Kaisha, Tokyo (JP)

( * ) Notice: Subject to any disclaimer, the term of this patent is extended or adjusted under 35 U.S.C. 154(b) by 263 days.

(21) Appl. No.: 10/318,040

(22) Filed: Dec. 13, 2002

(65) Prior Publication Data

US 2003/0120954 A1 Jun. 26, 2003

(30) Foreign Application Priority Data

Dec. 26, 2001 (JP) .......................................... 2001-394082

(51) Int. Cl.$^7$ ............................................... G06F 15/00
(52) U.S. Cl. ..................... 358/1.15; 358/1.13; 358/1.14; 358/468
(58) Field of Search ................................ 358/1.12, 1.13, 358/1.14, 1.15, 462, 468, 1.1, 1.5, 1.18

(56) References Cited

U.S. PATENT DOCUMENTS 6,163,383 A * 12/2000 Ota et al. ..................... 358/1.1
6,545,767 B1 * 4/2003 Kuroyanagi ................ 358/1.14

* cited by examiner

*Primary Examiner*—Mark Wallerson
(74) *Attorney, Agent, or Firm*—Fitzpatrick, Cella, Harper & Scinto

(57) ABSTRACT

The present invention has an object to avoid an inconvenience of potentially not being able to use a department managing function. In a system environment to which the department managing function is to be applied, if two-way communication between a printer and a client computer is anticipated to be inoperable, the processing is switched over so as not to carry out an authentication processing using two-way communication.

18 Claims, 13 Drawing Sheets

PRINTING SYSTEM, INFORMATION PROCESSOR, AND AUTHENTICATING METHOD

BACKGROUND OF THE INVENTION

1. Field of the Invention

The present invention relates to a printing controller, a printing controlling method and a recording medium storing a program for printing control. More particularly, the invention relates to a system comprising an information processor such as a personal computer, and an output unit such as a printer.

2. Description of the Related Art

In the area of printing system technology, techniques are available for department management. There are broadly two functions. One relates to techniques regarding authentication processing which limits a user to use of a specific printer or identifies the location of the user by means of a given department ID (or a host ID, or a user ID). The other category covers techniques of recording the state of utilization of printing devices and facilities (for example, the number of sheets of paper used) for each location to which the department IDs correspond, and summing up the results, thereby calculating accounting data for each location. Particularly, the former authentication processing is achieved by carrying out communications with the printer main body by use of a two-way communication function of a separately provided utility.

However, the authentication processing is performed only in a system configuration in which the utility permits two-way communication. A problem lies in that, in a system configuration not ensuring two-way communication, an authentication processing is not available.

When department management is conducted on the printer side, printing is limited unless the authentication is allowed. As a result, circumstances preventing printing may be encountered. In such a system, therefore, the department managing function, including the numerical processing function, a separate function, is not available at all.

Also, it is difficult to continue improving the utility so as to ensure the above-mentioned operation for all of diverse and various system configurations, which are improved from time to time. It has therefore been very difficult to completely avoid the discussed inconveniences.

SUMMARY OF THE INVENTION

An object of the present invention is to avoid the inconvenience of the unavailability of the department managing function, when two-way communication between a printer and a client computer is considered unavailable in a system environment in which the department managing function is to be applied, by switching over processing so as not to perform authentication processing by use of two-way communication.

Another object of the invention is to increase applicability of the system for a user by executing switching of processing automatically on the basis of the system configuration.

Further objects, features and advantages of the present invention will become apparent from the following description of the preferred embodiments with reference to the attached drawings.

DESCRIPTION OF THE PREFERRED EMBODIMENTS

Embodiments suitable for application of the present invention will now be described.

Figure 1:
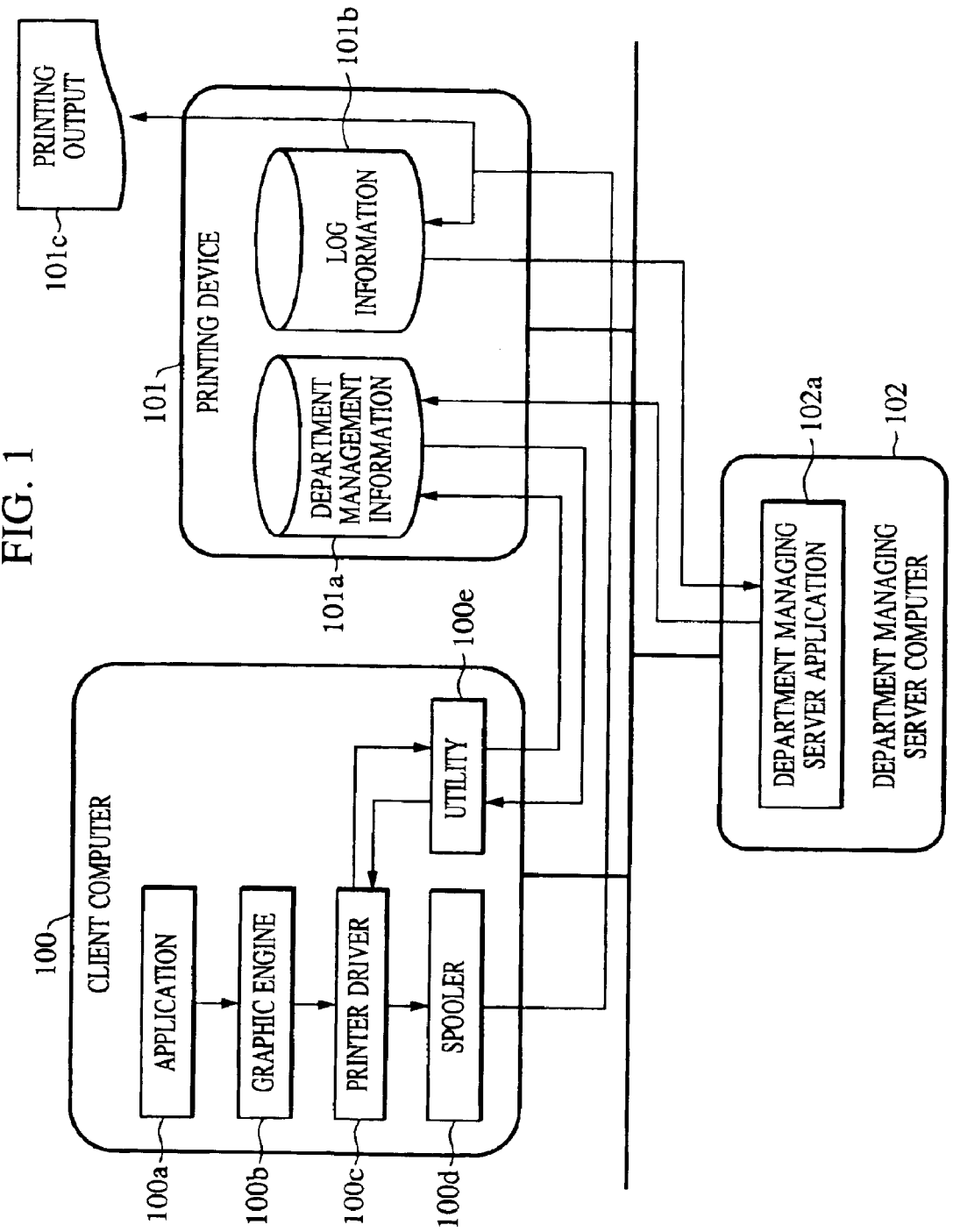
FIG. 1 is a functional block diagram illustrating a typical department managing system.

The department management system of the invention will first be described. FIG. 1 is a functional block diagram illustrating a typical department management system. In this system, a client computer 100, a printer 101, and the department managing server computer 102 are connected via a network. FIG. 1 illustrates a case where a single client computer and a single printer are employed. Actually, a plurality of client computers and a plurality of printers may be connected via a network.

The printer 101 may be a laser beam printer, an ink-jet printer, a copying machine, a composite machine, a facsimile machine, or the like.

An operating system (hereinafter notated as an "OS") is installed in the client computer 100, and an application 100a necessary for printing and a printer driver 100c are installed on the OS.

Printing is usually started by a user's specification in the application 100a, and upon the start of printing, the application 100a issues a GDI (graphics device interface) to a graphics engine 100b. In response to this, the graphics engine 100b converts the received GDI into a DDI (device driver interface), and issues the same to the printer driver 100c.

The printer driver 100c having received the DDI converts the same into print data such as a PDL, which is a data dependent upon the printer, and issues the print data as a printing job to a spooler 100d of the OS.

The printing job issued to the spooler 100d is transferred to the specified printer 101 by the port managing function of the OS. The printer 101 performs printing in accordance with the specification of the received printing job.

A department managing utility 100e is installed in the client computer. This utility has a function of performing two-way communication with the printer 101, which permits inquiry of authentication described later.

The printer 101 should have a department managing function. More specifically, the printer 101 should be capable of holding therein information necessary for department management such as department management information 101a and log information 101b, and of executing processing by means of such information including determination for authentication.

A department managing server application 102a is installed in the department managing server computer 102. The department managing server application 102a can compile department management information 101a held by the printer 101. The department managing server application 102a can acquire log information 101b held in the printer 101, and calculate the number of used sheets of paper and accounting data for each department on the basis of this information.

Figure 2:
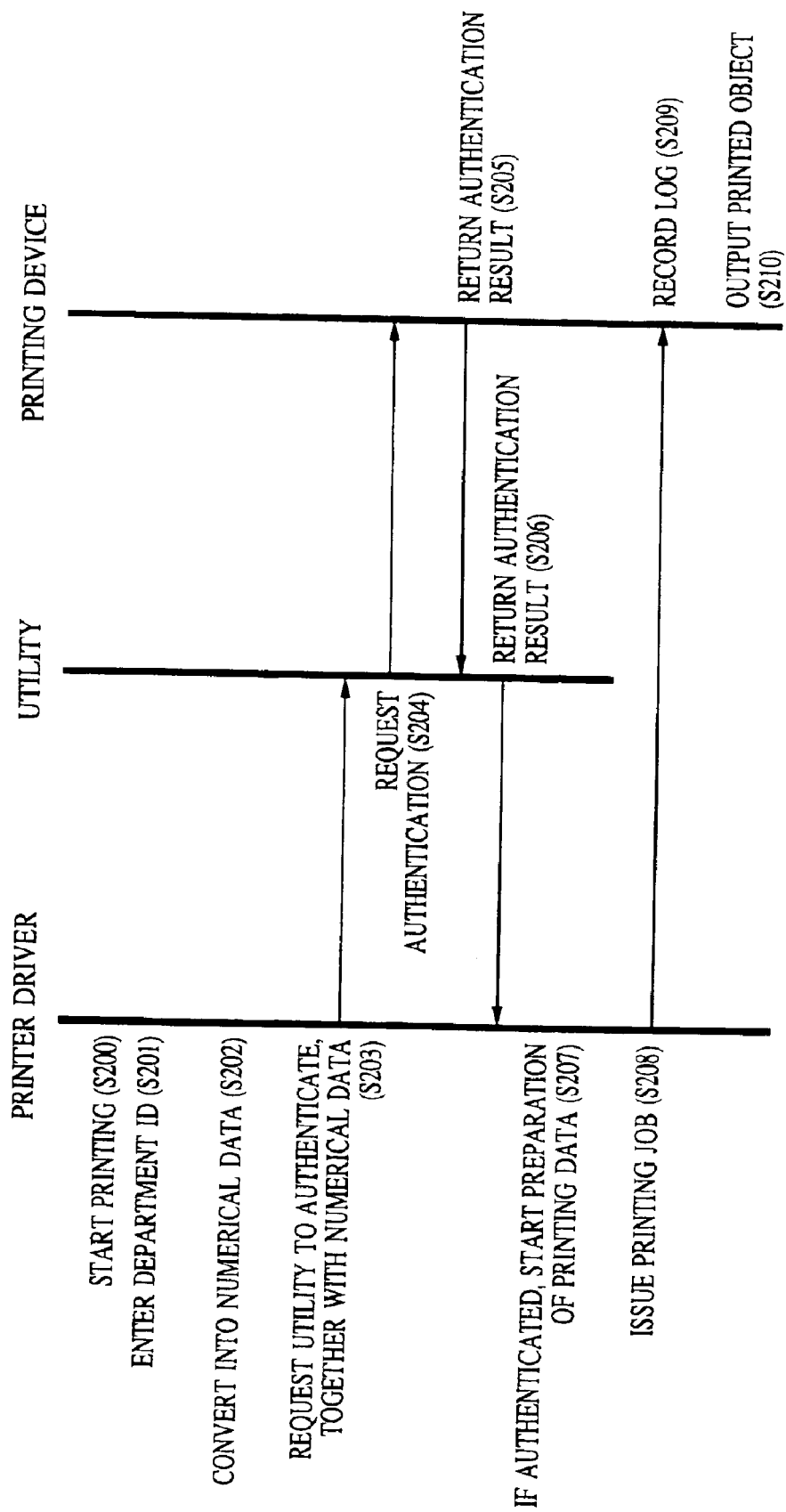
FIG. 2 schematically illustrates the flow of printing to which department management is applied.

The department management carried out in the aforementioned environment will now be described along the actual flow of printing. FIG. 2 is a schematic representation of the flow of the printing process in which department management is performed. When printing is started in the application 100a installed on the client computer 100, the printer driver is started up via the graphics engine 100b (step S200). In the department management environment described here, however, authentication processing should be conducted prior to starting conversion into print data by the printer driver The printer driver 100c, having received a DDI specification from the OS, provides the user with a user interface for display or input of information prior to the start of processing, thereby urging input of a department management ID (identification information) and a password (step S201).

Figure 3:
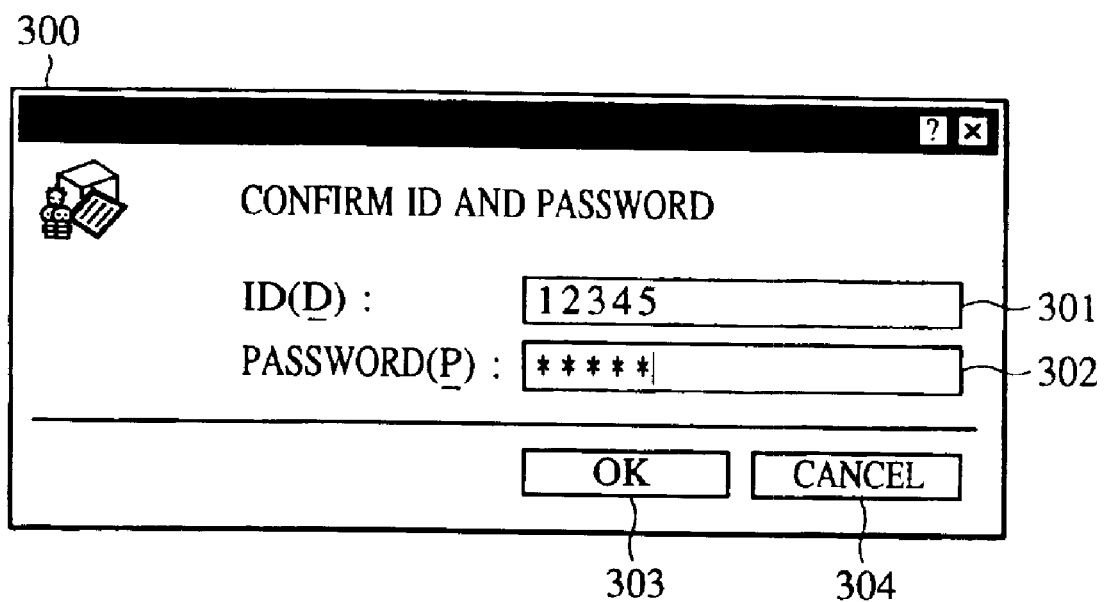
FIG. 3 illustrates an example of the user interface screen.

FIG. 3 illustrates a typical use interface screen. The user enters a department ID into an input area 301, and a password into an input area 302, and authentication processing is started by pressing a button 303. When the button 304 is pressed, the authentication processing is interrupted (the authentication processing is omitted), and preparation of print data is started. However, insertion of a department management ID into the printing job described later is not performed. Therefore, whether or not the printing job is actually executed by printing is dependent solely upon whether or not the setting on the printer side allows printing. If a password is not set on the printer side to be authenticated, it is not necessary to enter a password. The password will not particularly be described hereafter, but is treated always as potentially integral with the department ID as a piece of information included therein.

Input of necessary information causes authentication processing to be started (step S201). The department ID is converted into numerical data (step S202).

The department ID entered into the printer driver 100c via the user interface 300 is passed, together with the request for an authentication processing, to the department managing utility 100e (step S203). The department managing utility 100e performs an inquiry as to whether or not the department ID is proper by means of the two-way communication function with the printer 101 thereto (step S204). The printer 101, in response to this inquiry, collates the same with department management information 101a previously registered in it. Legality is evaluated, and the result is returned to the department managing utility 100e (step S205).

The department managing utility 100e sends the received result of determination to the printer driver 100c (step S206). When this result of determination is proper, the printer driver 101c starts conversion processing converting the DDI received from the OS into print data (step S207). In the meantime, the department ID is inserted into the print data to be prepared.

Figure 4:
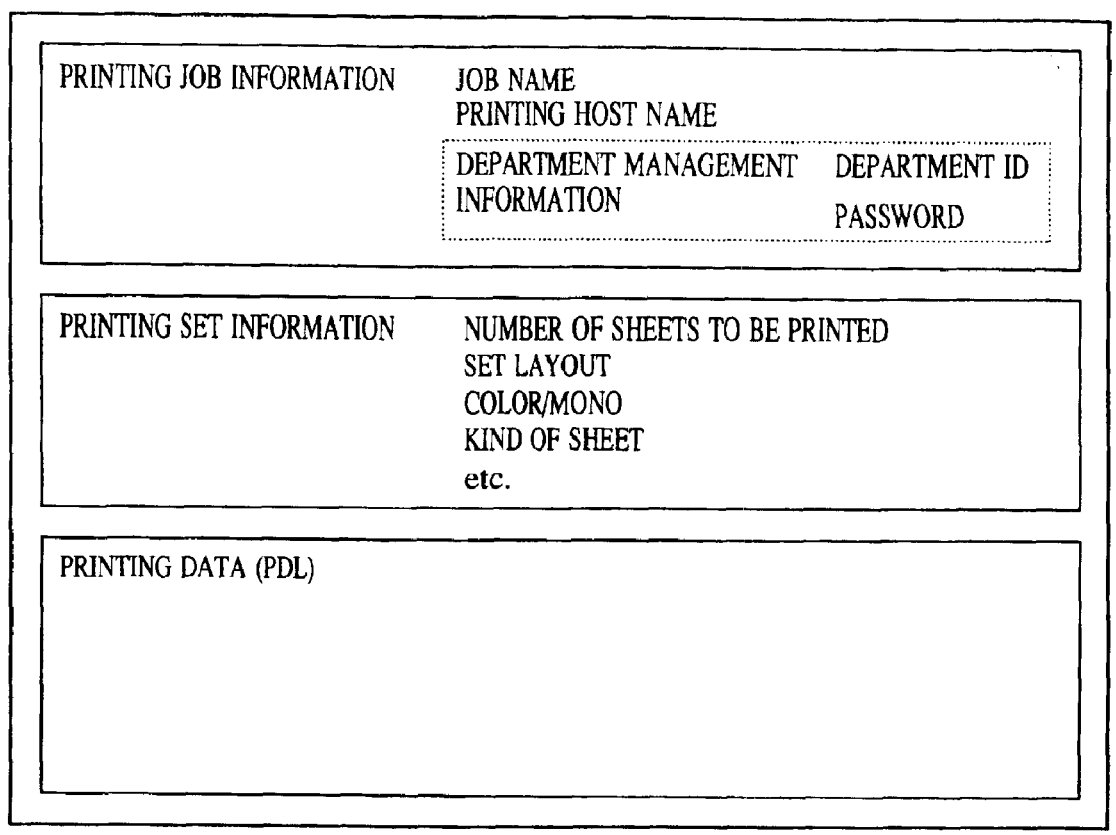
FIG. 4 illustrates a data configuration of a printing job to be prepared.

FIG. 4 illustrates the data configuration of the prepared printing job. The data of the printing job mainly comprise printing job information, printing setting information and print data. The printing job information includes information showing the job name, information showing the name of the computer having prepared the printing data (host name), and department managing information. The department ID and the password are stored as department managing information. The printing setting information includes information showing the number of printed sheets (number of copies), the setting of layout, specification of color/monochrome, and the type (kind) of paper. The print data are denoted in PDL, and an image based on the print data is printed on the printer.

Figure 5:
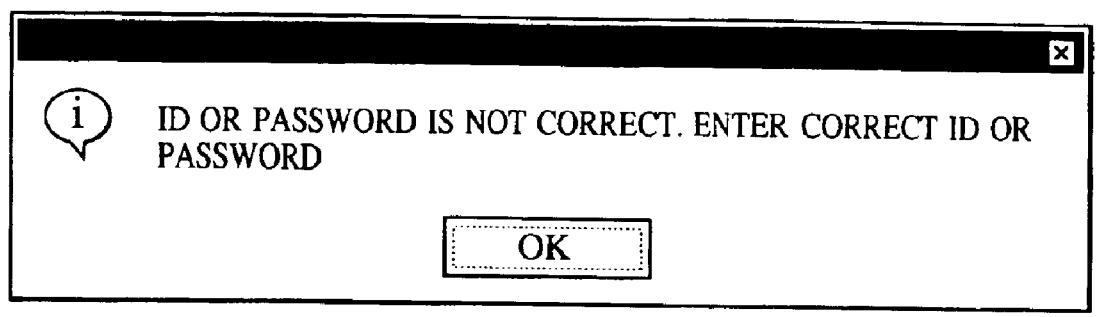
FIG. 5 illustrates a typical user interface screen informing failure of authentication.

When the information is determined to be illegal through the authentication processing in step S207, a user interface screen to that effect is displayed (FIG. 5), and re-entrance of the department ID and the password is urged by displaying the user interface screen shown in FIG. 3. Conversion into print data is therefore never performed unless a correct department ID is entered, thus permitting restriction of users of this printer. FIG. 5 illustrates a typical user interface screen notifying failure of authentication.

As in usual printing, the prepared print data are issued to a specified printer 101 via the spooler 100d of the OS (step S208). The printer 101 executes printing in accordance with the specification of the received print data, and generates a print output 101 (step S209). At this point in time, the department ID inserted into the printing job is held in as log information 101b, together with pieces of information such as the count information of the printing job including, for example, the number of printed sheets, specification of two-side printing, a special kind of sheet (paper type), and specification of monochrome of color.

As a result, the department managing server application 102a can compute what kind of printing each department is carrying out, and how the printers are operated, on the basis of the department ID and the corresponding pieces of counting information.

The department managing information 101 used for authentication and the log information 101b used for counting can be controlled by the department managing server application 102a. This function is applicable to a plurality of printers connected via the network, thus making it possible to achieve unified management of them.

As described above, the department managing function mainly comprises user management through authentication processing, and counting management using the log function. However, the former authentication processing assumes availability of the authenticating utility capable of providing the two-way communication function with the printer, as described above. The authentication processing may result in the following inconveniences when the two-way communication function does not operate normally.

Figure 6:
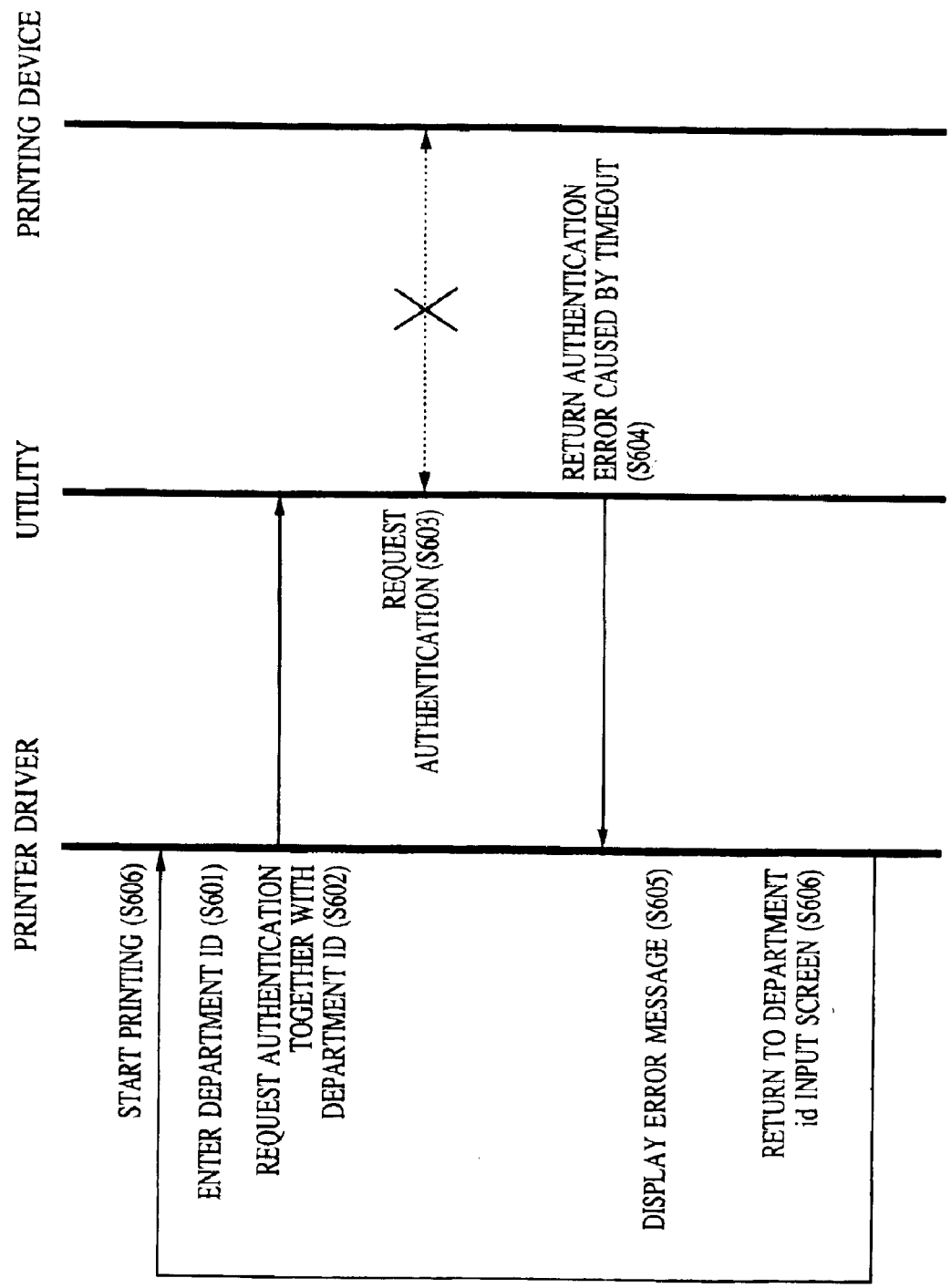
FIG. 6 illustrates the flow of processing when two-way communication does not operate normally.

FIG. 6 illustrates the flow of processing in a case where two-way communication does not operate normally. In this case, the department managing utility 100e transmits a request for authentication processing to the printer 101 in response to the request for authentication processing from the printer driver 100c (step S603). However, because two-way communication is not ensured, it is impossible to acquire the result of authentication.

Unavailability of the result of authentication processing may be attributable to a case, for example, where the request for authentication processing is not received by the printer 101, or a case where the result of the authentication processing from the printer 101 is not transmitted to the department managing utility 100e.

In these cases, the department managing utility 100e waits for a response from the printer for a predetermined period of time, interrupts the request for authentication to the printer, and sends a reply to the printer driver 100c to the effect that the authentication could not be accomplished (step S604).

Figure 7:
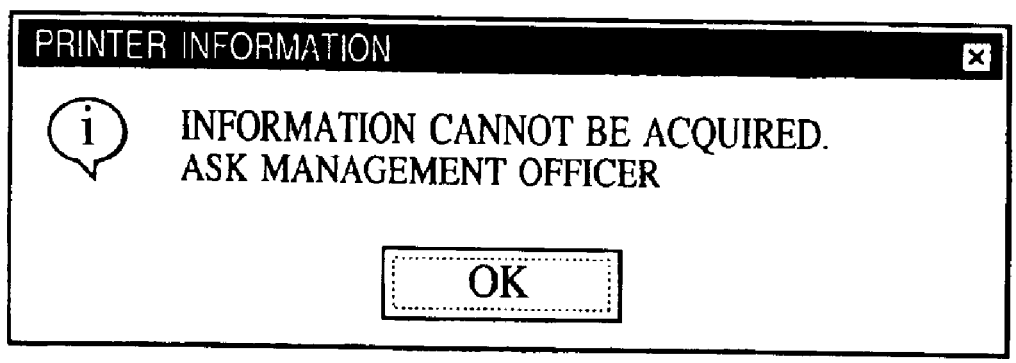
FIG. 7 illustrates a typical user interface screen notifying failure of authentication processing.

Upon receipt of this response, the printer driver 100c displays a user interface screen showing the failure of the authentication processing (step S605). FIG. 7 illustrates a typical user interface screen notifying the failure of authentication processing.

In this case, a printing job is not generated by the printer driver 100c. After display of this user interface screen, a user interface screen for input of the department IC (FIG. 3) is displayed again to urge re-entrance of the department ID to the user (step S606).

The retry naturally results in the same result, making it impossible to continue printing. To avoid this inconvenience, it is necessary to interrupt the printing process, and carry out printing again after releasing the setting of department managing processing (authentication processing). After releasing the setting, the prepared printing job becomes an "indefinite ID job" into which the department ID is not inserted. In a system environment under department management, however, output of such data is usually limited by the setting on the printer side. It is additionally necessary, therefore, to release the setting restricting the output. In this case, since there is no means to specify user's department, log recording and counter processing using the same, another function of department management, are of course inoperable.

Figure 8:
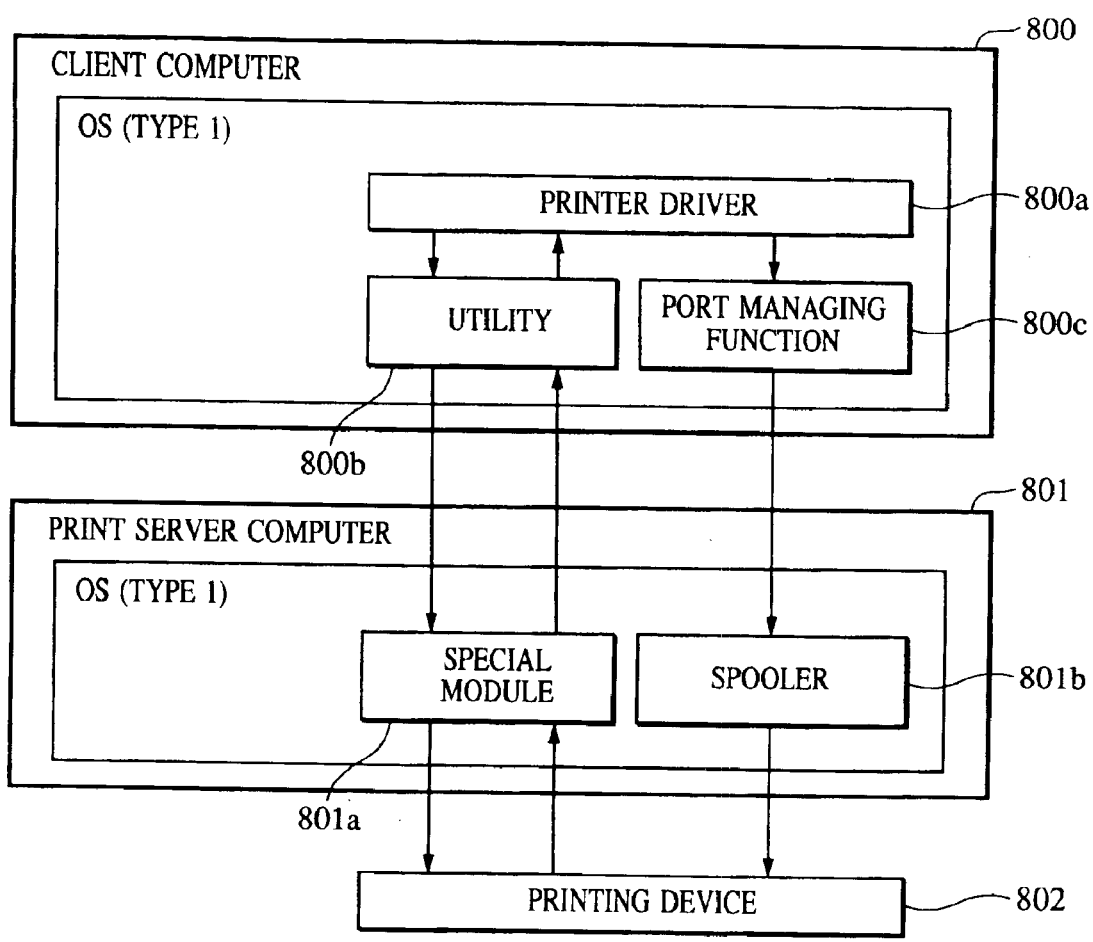
FIG. 8 illustrates the flow of authentication processing steps in a printing system using a client computer 800 and a print server computer 801.

FIG. 8 illustrates the flow of the authentication processing in a printing system using a client computer 800 and a print server computer 801. In this environment, a utility software program 800b installed in the client computer 800 cannot access directly the printer 802. This is due to the fact that the path to the printer 802 is concealed by the server computer 801.

A special module 801a is therefore installed also in the print server computer 801. As a result, a request for authentication issued by the printer driver 800a is sent to the printer 802 via the utility 800b and the special module 801a. The result of authentication performed by the printer 802 is similarly returned to the printer driver 800a via the special module 801a and the utility 800b.

This permits two-way communication to the printer 802. However, because this special module 801a assumes operation on a prescribed OS (operating system), it is inoperable in an environment other than this.

Figure 9:
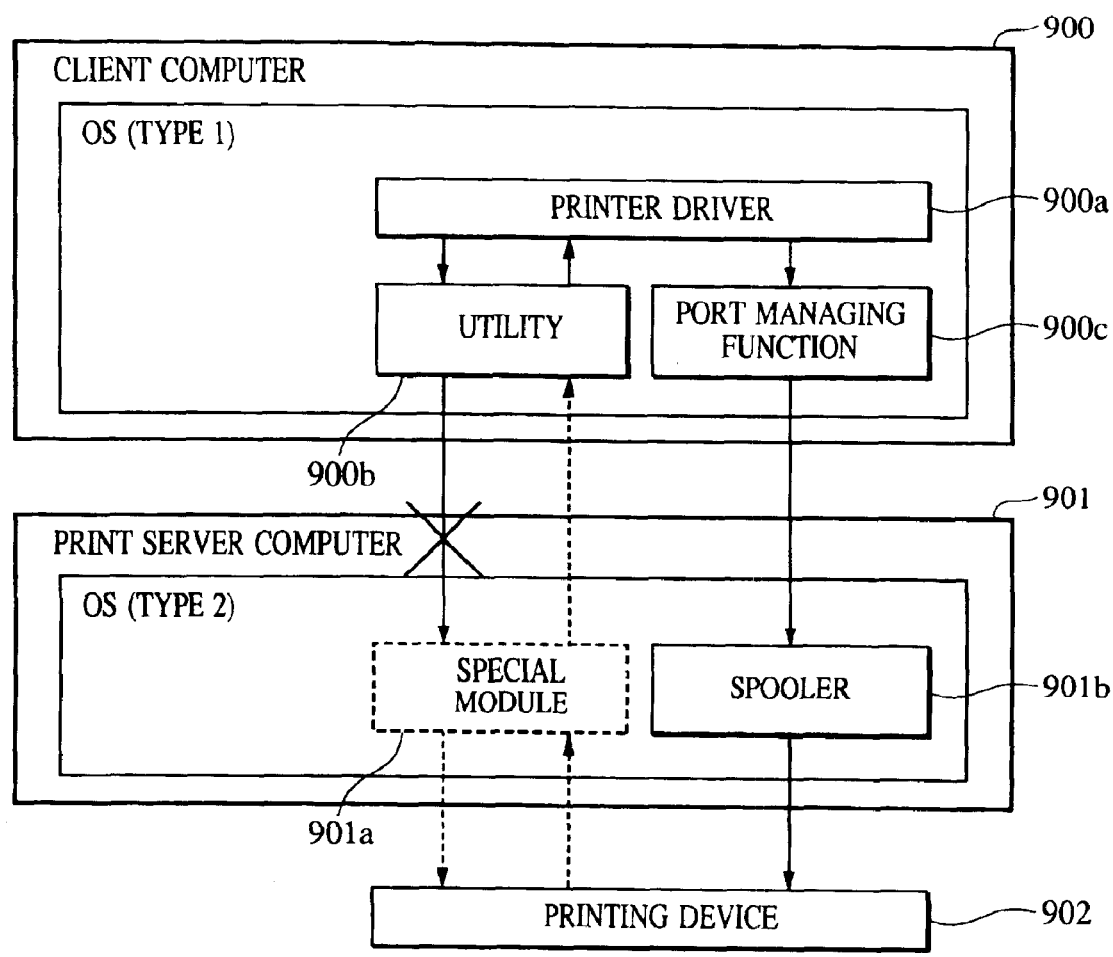
FIG. 9 illustrates a printing system using a print server 901.

FIG. 9 illustrates, as in FIG. 8, a printing system using a print screen 901. In FIG. 9, however, the OS used in a print server computer 901 is different in kind from the OS shown in FIG. 8. That is, the OS used in the client computer 900 is an OS (type 1) and the OS used in the client server computer 901 is an OS (type 2).

Because of the absence of a special module 901a operating on the OS (type 2), the printer 902 is concealed from the utility 900b of the client computer. The utility 900b cannot therefore find a communication path leading to the printer 902. Two-way communication is therefore impossible.

When the printer driver 900a actually issues a request for authentication, the utility 900b receiving the same tries to access the print server side. Since connection cannot be made, timeout occurs after the lapse of a certain period of time. Then, the print driver 900a receives an error of failure of authentication from the utility 900b. This causes an inconvenience, as described above, in which printing cannot be performed at all if application of department management is continued.

This embodiment covers a printing system based on a server of an OS (type 2). If, even for other factors, it is predicable that there may be inconvenience for the utility to carry out two-way communication, and the presence of such factors is identifiable, the present invention is similarly applicable. Other factors may include features related to the OS, also to the factor of OS, factors regarding the network, the cable (or other such physical factors), and the utility itself.

For the purpose of avoiding the inconvenience of inoperability of the department management function, resulting from the inability to perform two-way communication, without significant loss of function, the present invention provides the following operations.

Figure 10:
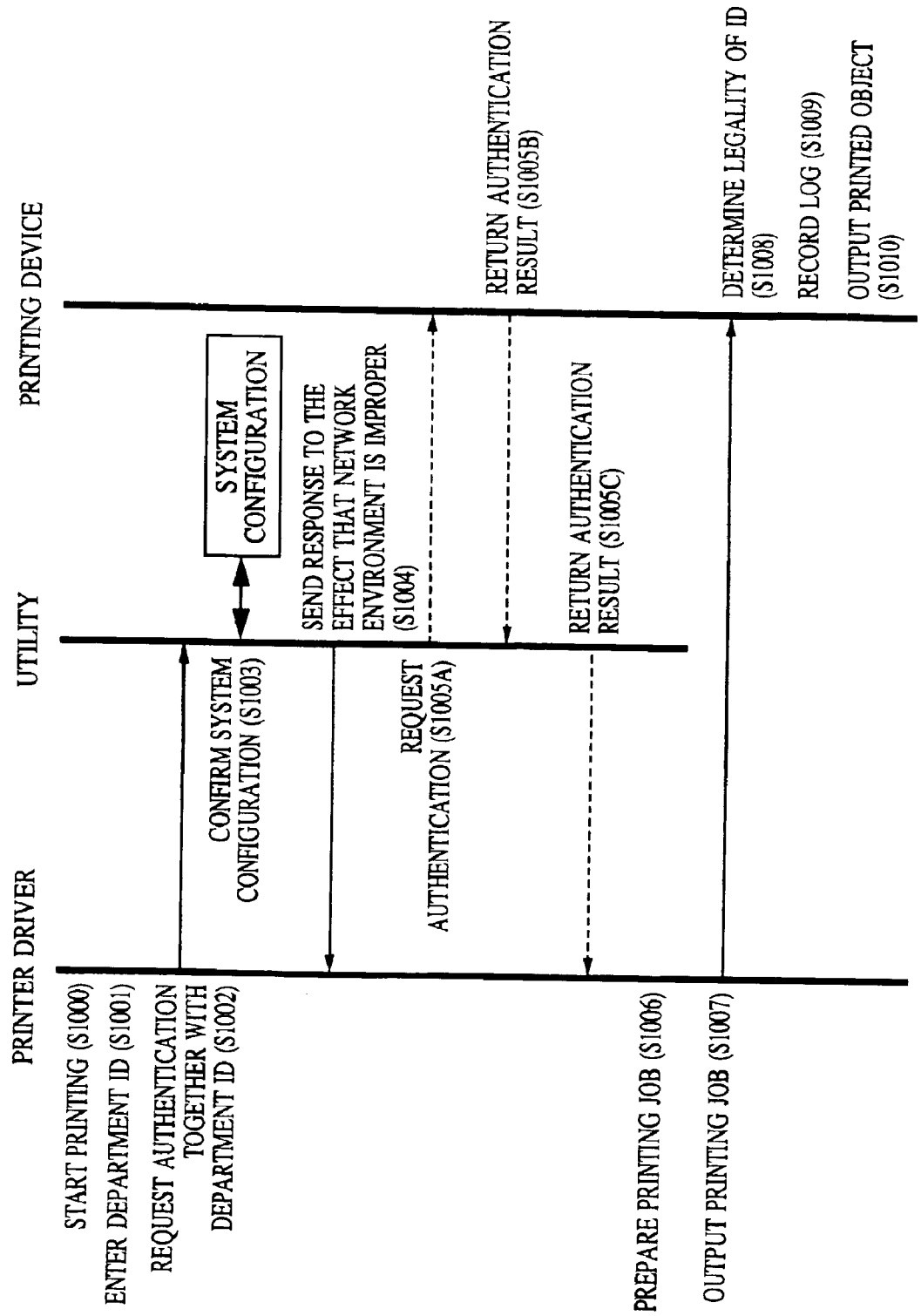
FIG. 10 is a flowxhart illustrating the flow of printing processing.

FIG. 10 is a flowchart illustrating the flow of the printing process. After the start of printing (step S1000), the printer driver 100c displays a user interface screen as shown in FIG. 3, and causes input of the department ID (step S1001). When the user enters the department ID in the screen of FIG. 3, the printer driver 100c issues a request for authentication processing to the department managing utility 100e (step S1002). These steps are the same as in the operations upon usual department management.

Upon receipt of this request, the department managing utility 100e confirms presence or absence of a factor which may cause an inconvenience for two-way communication in the configuration of the system serving as the path for authentication processing, prior to making an inquiry about authentication to the printer 101 (step S1003). An example of authenticating method will be described later. When two-way communication is not available judging from the determination at this point in time, step S1004 is executed. When two-way communication is applicable, steps S1005A to S1005C are executed.

When the network environment is determined to be such that two-way communication cannot be ensured, performance of an authentication processing in a usual manner can lead to occurrence of the inconvenience as described above. It is therefore necessary to discontinue the authentication processing, and transmit an error code to the effect that the network environment is not appropriate to the printer driver 100c (step S1004). In this case, steps S1005A to S1005C are not executed. Upon receipt thereof, the printer driver 100c determines that retry of authentication processing makes no sense from the point of view of the network configuration, continues printing, prepares a printing job (step S1006), and issues the printing job to the printer 101 (step S1007). In this case, the department ID entered by the user is used as it is, irrespective of the legality thereof, as the department ID to be inserted into the printing job.

When two-way communication is determined to be possible as a result of confirmation, on the other hand, availability of the authentication processing is estimated. The subsequent operations are therefore the same as those for the conventional authentication processing. More specifically, the department managing utility 100e issues a request for authentication to the printer 101 (step S1005A). The printer 101 returns the result of authentication to the department managing utility (step S1005B), and the department managing utility 100e transmits the result of authentication to the printer driver 100c (step S1005C).

The legality of the department ID inserted into the printing job sent to the printer 101 is determined by the printer 101 (step S1008). If the department ID is determined to be legal, the result of printing including this department ID is recorded as a log information, as in the conventional department management (step S1009), and a printed matter corresponding to the printing job is output (step S1010).

When the department ID is determined to be illegal, on the other hand, log recording or generation of a printed matter is not conducted for the printing job transferred and received, but instead this printing job is deleted from the printer, and the processing comes to an end.

Figure 11:
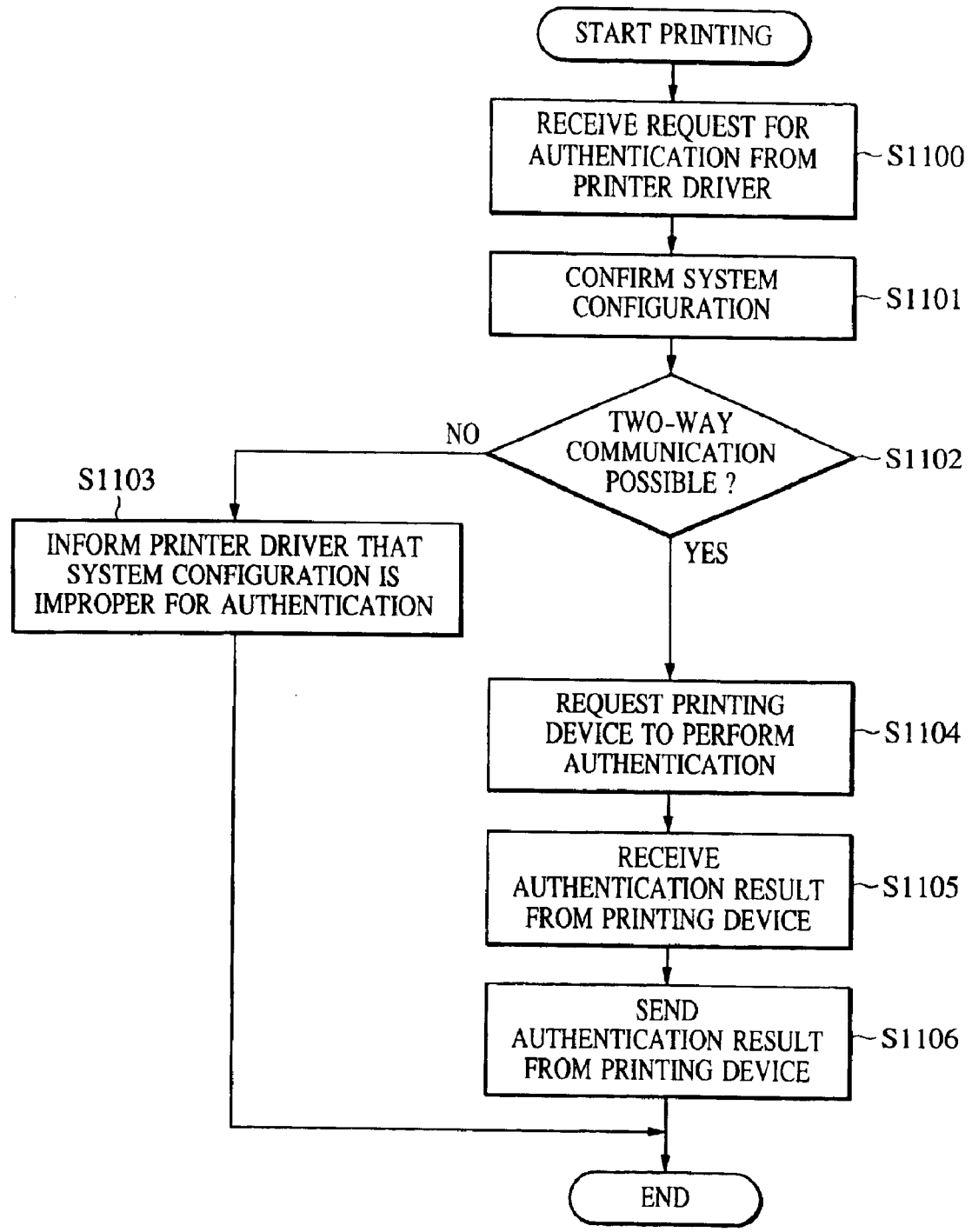
FIG. 11 is a flowchart illustrating processing executed by a department managing utility 100e.

FIG. 11 is a flowchart illustrating the processing for execution by the department managing utility 100e. The department managing utility 100e, upon receipt of a request for authentication from the printer driver 100c (step S1100), confirms whether or not there is a factor which may cause an inconvenience for two-way communication in the system configuration serving as a path for authentication processing (step S1101). It is determined whether or not two-way communication with the printer is available (step S1102). An example of the confirming method will be described later.

If it is determined that two-way communication is not available judging from the result of determination, the process advances to step S1103. When two-way communication is available, the process proceeds to step S1104. If it is determined that the network environment does not permit two-way communication, performance of a usual authentication processing leads to occurrence of an inconvenience as described above. To discontinue the authentication processing, therefore, an error code showing that the network environment is not suitable is transmitted to the printer driver 100c (step S1103).

On the other hand, when two-way communication is determined to be available as a result of confirmation, the subsequent operations are the same as in the conventional authentication processing. That is, the department managing utility 100e issues a request for authentication to the printer 101 (step S1104). Upon receipt of the result of authentication from the printer 101 (step S1105), the result of authentication is transmitted to the printer driver 100c (step S1106).

Figure 12:
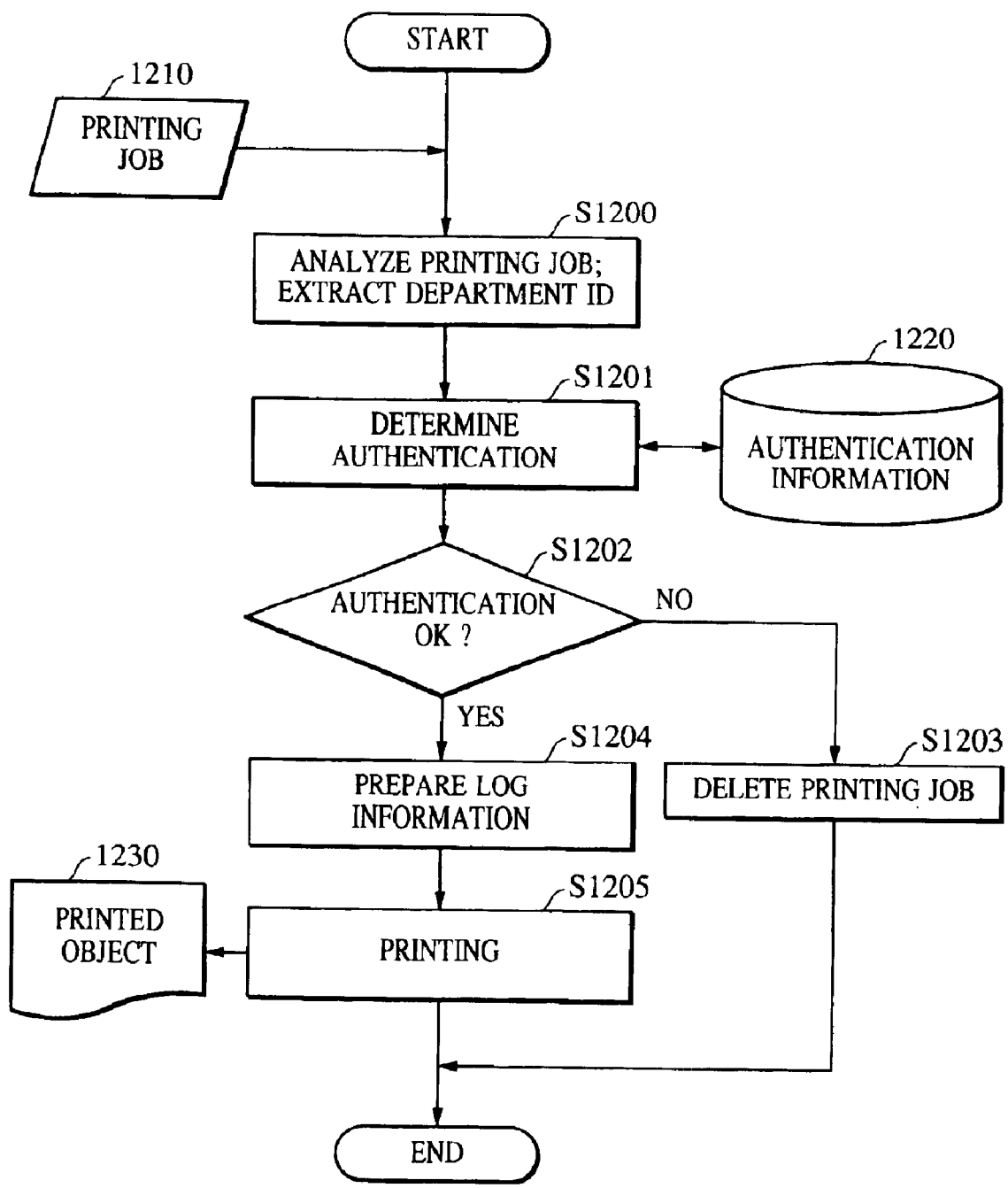
FIG. 12 is a flowchart illustrating the flow of processing step executed by a printer 101.

FIG. 12 is a flowchart illustrating the flow of processing for execution by the printer 101. Upon receipt of the printing job 1210, the printer 101 analyzes the data of the printing job, and extracts the department ID (step S1200). The legality of the department ID is determined by comparing the thus extracted department ID with authentication information 1220 previously set (step S1201). Or, it is determined whether or not printing is allowed for the department ID. The authentication information is stored in the memory of the printer.

When the department ID is registered in the authentication information, or when printing is allowed for the department ID, the result of authentication is determined to be acceptable (step S1202). The process then advances to step S1204. If the authentication is not acceptable, the process goes to step S1203.

When the authentication is acceptable, the processed contents of the received printing job 1210 are stored as log information (step S1204). The log information provides the number of printed sheets (number of sheets used for printing, and/or number of printed surfaces), specification of two-side printing or one-side printing, specification of color printing or monochromatic printing, and presence of staples. Finally, printing processing is conducted to print-output a printed matter 1230 (step S1205).

When the authentication is not acceptable, the printing job is not processed but deleted (step S1203).

As described above, only when the department ID is illegal, the user cannot obtain a printed matter against expectation. Even in this case, however, the other department managing functions including the restriction on users in terms of the department ID, and the counting processing for each department are available. Except for cases where the ID is illegal as described above, the user can utilize the department managing function without paying particular attention to the difference between the presence and absence of the two-way communication function. Thus, by allowing for automatic switch over of processing, it is not necessary for the user to have trouble to make a setting in response to a system configuration.

Figure 13:
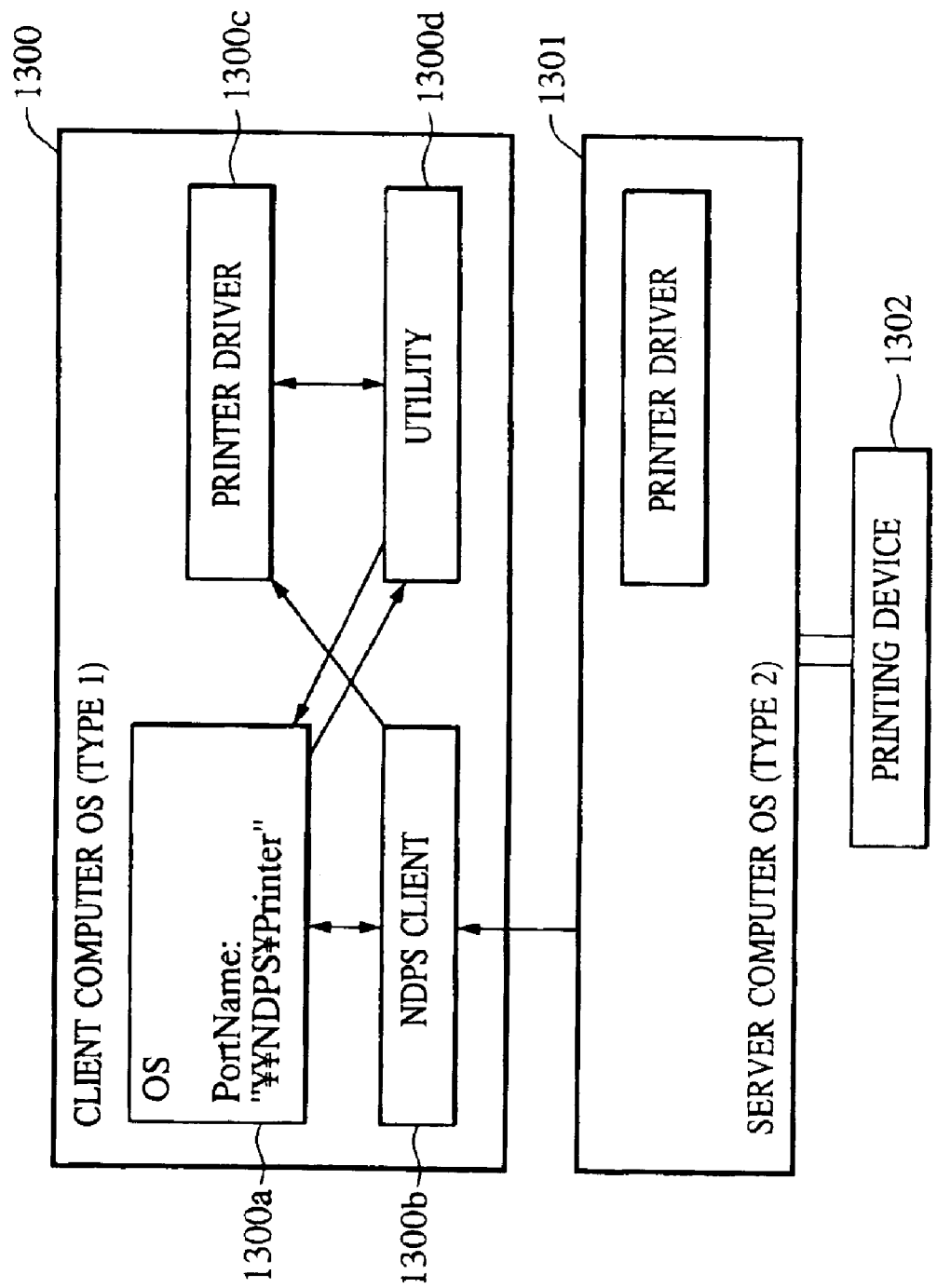
FIG. 13 illustrates a typical method for confirming a system configuration.

FIG. 13 illustrates a typical method for confirming a system configuration. The server of the OS (type 2) has a function known as NDPS of managing the printing functions on the network in a unified manner. FIG. 13 shows a printing system comprising a print server computer 1301 using this function and a client computer 1300.

It is assumed that a printer 1302 is connected to the server computer 1301. This printer 1302 can be used as a common printer for a plurality of computers by use of the NDPS function.

The printer driver 1300c is installed with a shared printer 1302 as an output destination by using the NDPS client 1300b installed in the client computer 1300. Information including names of output destinations (ports) is recorded in association with the OS 1300a.

When printing is started, and the authentication processing is started, a utility 1300d makes an inquiry of printer information to the OS 1300a. The utility 1300d determines whether or not the driver has been installed by use of NDPS by confirming the port name in the output destination information returned from the OS 1300a. If the driver has been installed by use of NDPS, the utility 1300d determines that the OS (type 2) is applied to the server and performs switching to the avoidance processing as described above. This is only an example of the determining method, and if there is another factor to be avoided, a determining method corresponding to such a factor should be provided.

As a result, by applying the present invention, it is possible to avoid circumstances leading to inoperability of the two-way communication function, depending upon the system configuration, while inhibiting occurrence of functional restriction as far as possible and while preventing impairment of availability by making it unnecessary for the user to pay attention to the switching of processing. It is also possible to use the department managing function in an environment with which the conventional art could not cope.

In the above description, the department ID may be, in addition to identification information identifying the department, identification information identifying the host computer, or identification information identifying the user.

The authentication processing is carried out in the printer 101. When an authenticating unit performing authentication processing on the basis of the department ID is provided in the network, the printer 101 and the authenticating unit may be replaced by each other.

Of course, the object of the present invention can be achieved also by connecting a storage medium storing the program codes of the software for embodying the functions of the above-mentioned embodiments (program codes corresponding to the flowcharts shown in FIGS. 10 to 12) to the system or the apparatus, and reading and executing the program codes stored in the storage medium by the computer of the system or the apparatus (CPU or MPU of the client computer or CPU or MPU of the printer 101).

In this case, the program codes themselves read out from the storage medium would achieve the novel functions of the invention, and the storage medium storing the program codes would form the present invention.

Applicable storage media for supplying the program codes include, for example, a floppy disk, a hard disk, a magneto-optical disk, an optical disk, a CD-ROM, a CD-R, a magnetic tape, a non-volatile memory card, a ROM, a DVD, and a DVD-ROM.

The functions of the aforementioned embodiments can be achieved by a computer's execution of the readout program codes. In addition, the OS and the like operating on the computer carry out all or part of the actual processing in accordance with instructions of the program codes, and such processing can achieve the functions of the above-mentioned embodiments.

When the program codes read out from the storage medium are written in a memory of a function expanding board inserted into the computer or a function expanding unit connected to the computer, and a CPU or the like of this function expanding board or the function expanding unit performs all or part of the actual processing on the basis of the instructions of the program codes, such processing can achieve the functions of the above-mentioned embodiments.

The present invention is of course applicable also when distributing the program codes of the software for achieving the functions of the aforementioned embodiments to requesters via a communication line such as personal computer communication from the storage medium storing the program codes.

As described above, contrary to the conventional system configuration in which the department managing function is unavailable because of the unavailability of two-way communication, the present invention permits utilization of the department managing function while inhibiting occurrence of functional restrictions as far as possible.

In cases other than a case where the ID is illegal, the user can utilize the department managing function without paying particular attention to the difference between the presence and absence of the two-way communication function.

Switching of processing can be automatically accomplished on the basis of an internal determination of the system. This solves the user's troubles by eliminating the necessity for the user to change a setting corresponding to a system configuration.

While the present invention has been described with reference to what are presently considered to be the preferred embodiments, it is to be understood that the invention is not limited to the disclosed embodiments. On the contrary, the invention is intended to cover various modifications and equivalent arrangements included within the spirit and scope of the appended claims. The scope of the following claims is to be accorded the broadest interpretation so as to encompass all such modifications and equivalent structures and functions.

What is claimed is:

1. A printing system which requests execution of authentication processing, by a printer, by transmitting entered authentication information to the printer which performs authentication processing on the basis of identification information, comprising:

determining means which determines whether or not a result of authentication processing is available from the printer;

authentication requesting means which, when said determining means determines the result of authentication processing is available, requests execution of authentication processing from the printer to acquire the result of the authentication processing; and issuing means which, when said determining means determines the result of authentication processing is unavailable, without requesting execution of authentication processing by said authentication requesting means, issues a printing job including the entered authentication information and printing data to the printer.

2. An information processor which requests execution of authentication processing, by a printer, by transmitting entered authentication information to the printer which performs authentication processing on the basis of identification information, comprising:

determining means which determines whether or not a result of authentication processing is available from the printer; and authentication requesting means which, when said determining means determines the result of authentication processing is available, requests execution of authentication processing from the printer to acquire the result of the authentication processing; and issuing means which, when said determining means determines the result of authentication processing is unavailable, without requesting execution of authentication processing by said authentication requesting means, issues a printing job including the entered authentication information and printing data to the printer.

3. An information processor according to claim 2, wherein said determining means determines whether or not the result of authentication processing is available from the printer on the basis of information concerning the system configuration of a printing system including said information processor.

4. An information processor according to claim 2, wherein said information processor has display control means which, when said determining means determines authentication processing is unavailable, causes a display to display a message indicating that the result of the authentication processing is unavailable.

5. An information processor according to claim 2, wherein said authentication requesting means, when said determining means determines the result of authentication processing is available, requests execution of an authentication processing by transmitting entered authentication information to the printer; and said issuing means issues entered authentication information and printing data to the printer if the result of authentication processing, transmitted from the printer in response to the request by said authentication requesting means, is proper.

6. An information processor according to claim 2, wherein said information processor has display control means which causes a display to display an input screen for entering identification information in response to a printing instruction.

7. An authenticating method for performing authentication processing, by a printer, on the basis of identification information when using a printer, comprising:

a determining step of determining whether or not result of authentication processing is available from the printer;

an authentication requesting step, when availability of the result of authentication processing is determined in said determining step, of requesting execution of authentication processing from the printer to acquire the result of the authentication processing; and an issuing step, when unavailability of the result of authentication processing is determined in said determining step, without requesting execution of authentication processing in said requesting step, of issuing a printing job including entered authentication information and printing data to the printer.

8. An authenticating method according to claim 7, wherein said determining step determines whether or not the result of authentication processing is available from the printer on the basis of the information showing the system configuration of a printing system executing said authentication method.

9. An authenticating method according to claim 7, further comprising a display controlling step, when unavailability of authentication processing is determined in said determining step, of causing a display to display a message indicating that the result of authentication processing is unavailable.

10. An authenticating method according to claim 7, further comprising an issuing step of issuing the entered authentication information and printing data to the printer if the result of authentication processing, transmitted by the printer in response to the request in said authentication requesting step, is proper.

11. An authenticating method according to claim 7, wherein a status of utilization of the printer is managed for each piece of identification information by acquiring information showing the history of use from the printer.

12. A program on a computer readable medium executed in a system performing authentication processing, by a printer on the basis of identification information when using a printer, which causes a computer to execute:

a determining step of determining whether or not a result of authentication processing is available from the printer;

an authentication requesting step, when availability of the result of authentication processing is determined in said determining step, of requesting execution of authentication processing from the printer to acquire the result of the authentication processing; and an issuing step, when unavailability of authentication processing is determined in said determining step, without requesting execution of authentication processing in said requesting step, of issuing a printing job including entered authentication information and printing data to the printer.

13. An information processor which requests execution of authentication processing by transmitting entered authentication information to an authenticating unit which performs authentication processing on the basis of identification information, comprising:

a memory storing a control program including a determining step of determining whether or not a result of authentication processing is available from the authentication unit prior to requesting execution of authentication processing from the authentication unit, and a discontinuing step of discontinuing requesting execution of authentication processing when unavailability of authentication processing is determined; and a processor which executes said control program stored in said memory.

14. An information processor according to claim 13, wherein, when unavailability of authentication processing is determined based on the identification information, said determining step determines whether or not the result of authentication processing is available from the authentication unit on the basis of information concerning a system configuration of a printing system including said information processor.

15. An information processor according to claim 13, wherein said control program further comprises a display controlling step, when unavailability of authentication processing is determined, of causing a display to display a message indicating that the result of authentication processing is unavailable.

16. An authenticating method of requesting execution of authentication processing by transmitting entered authentication information to an authentication unit which performs authentication processing on the basis of identification information, comprising:

a determining step of determining whether or not a result of authentication processing is available from the authentication unit prior to requesting execution of authentication processing from the authentication unit; and a controlling step, when unavailability of authentication processing is determined in said determining step, of discontinuing requesting execution of authentication processing.

17. An authenticating method according to claim 16, wherein said determining step determines whether or not the result of authentication processing is available from the authenticating unit on the basis of information showing the system configuration of a printing system executing said authentication method.

18. An authenticating method according to claim 16, further comprising a display controlling step, when unavailability of authentication processing is determined in said determining step, of causing a display to display a message indicating that the result of authentication processing is unavailable.

* * * * *

UNITED STATES PATENT AND TRADEMARK OFFICE
CERTIFICATE OF CORRECTION

PATENT NO. : 6,965,449 B2
DATED : November 15, 2005
INVENTOR(S) : Kouichi Sugiyama It is certified that error appears in the above-identified patent and that said Letters Patent is hereby corrected as shown below:

Column 2,
Line 15, "flowxhart" should read -- flowchart --.

Signed and Sealed this

Twenty-third Day of May, 2006

JON W. DUDAS
*Director of the United States Patent and Trademark Office*